United States Patent [19]

Masak et al.

[11] 4,170,775

[45] Oct. 9, 1979

[54] COMMUNICATION SYSTEM BEAMPORT SIDELOBE CANCELLER

[75] Inventors: Raymond J. Masak; Herbert F. Baurle, both of East Northport; Anthony M. Kowalski, Miller Place, all of N.Y.

[73] Assignee: The United States of America as represented by the Secretary of the Air Force, Washington, D.C.

[21] Appl. No.: 866,186

[22] Filed: Dec. 30, 1977

[51] Int. Cl.[2] .......... H04B 1/10

[52] U.S. Cl. .......... 343/100 LE

[58] Field of Search .......... 343/100 LE, 100 CL

[56] References Cited

U.S. PATENT DOCUMENTS 3,981,014 9/1976 Masak .......... 343/100 LE

*Primary Examiner*—Maynard R. Wilbur

*Assistant Examiner*—Richard E. Berger

*Attorney, Agent, or Firm*—Joseph E. Rusz; Willard R. Matthews, Jr.

[57] ABSTRACT

Multiple interference signals in an electromagnetic wave communication system are individually discriminated against by a beamport sidelobe canceller comprising a multichannel auxiliary system in which spatial filtering of the angular sectors of interest is performed prior to sidelobe cancellation. Each spatial filter of the auxiliary system has its own adaptive control and only those interfering signals appearing in its assigned sector are operated on by that loop. The output of the main communication system receiver is summed with the outputs of the auxiliary system channels to produce a system output and an adaptive control loop feedback signal. The feedback signal initiates the generation of a cancellation signal in any adaptive control loop in which correlation of interference signals occur in both the main communication system received signal and the signal received by the auxiliary system channel to which that loop is connected.

1 Claim, 3 Drawing Figures

COMMUNICATION SYSTEM BEAMPORT SIDELOBE CANCELLER

STATEMENT OF GOVERNMENT INTEREST

The invention described herein may be manufactured and used by or for the Government for governmental purposes without the payment of any royalty thereon.

BACKGROUND OF THE INVENTION

This invention relates to electromagnetic wave communication systems, and in particular to means for eliminating the effects of multiple interference sources on such systems.

Commonly, adaptive control loops or adaptive sidelobe cancellers are used to generate cancellation signals in response to interference signals. However, adaptive sidelobe cancellers have in many cases yielded poor performance when field tested against multiple jammers. One of the key factors contributing to this degradation is that loop gain for weak jammers in the presence of a dominant jammer falls rapidly (square law) as a function of weak jammer power level. A significant result of this effect is that little or no cancellation may be obtained for the weaker jammers while the dominant jammer is suppressed to system noise and in fact well below the weaker jammers. There currently exists, therefore, the need for a sidelobe cancelling means that simultaneously discriminates against multiple jamming signals and that further effectively discriminates against multiple weak jammers in the presence of a dominant jammer. The present invention is directed toward satisfying that need.

SUMMARY OF THE INVENTION

The beamport sidelobe canceller of the invention includes an array of antenna elements and an an antenna beam forming network. The antenna system is capable of generating multiple beams that collectively cover the angular region of space covered by the main communication system antenna. The beam forming network has output ports each of which is responsive to signals received from the section of space covered by an associated beam. An adaptive control loop is connected to each beam forming network output port. A combining means sums the main communication system receiver output with the output of the adaptive control loops and produces both a system output and an adaptive control loop feedback signal. The feedback signal initiates the generation of appropriate cancellation signals in those loops having an interference signal that correlates with the same interference signal in the main communication system received signal.

It is a principal object of the invention to provide a new and improved sidelobe cancelling means for an electromagnetic wave communication system.

It is another object of the invention to provide a beamport sidelobe canceller that is capable of simultaneously discriminating against a multiplicity of jamming signals.

It is another object of the invention to provide a beamport sidelobe canceller that is capable of effectively discriminating against multiple weak jamming signals in the presence of a dominant jamming signal.

These, together with other objects, features and advantages of the invention, will become more readily apparent from the following detailed description when taken in conjunction with the illustrative embodiment in the accompanying drawings.

DETAILED DESCRIPTION OF THE PREFERRED EMBODIMENT

The beamport sidelobe canceller of the invention comprehends the use of space filtering prior to performing actual sidelobe cancellation. This approach offers the advantage of substantially increasing the available loop gain for weaker jammers in the presence of a stronger jammer.

One form of space filtering which can be used in the practice of the invention is a beam forming matrix that generates multiple beams the related output ports of which drive a set of auxiliary adaptive control loops. The resulting system generates cancellation signals in individual control loops and is called a beamport sidelobe canceller.

Figure 1:
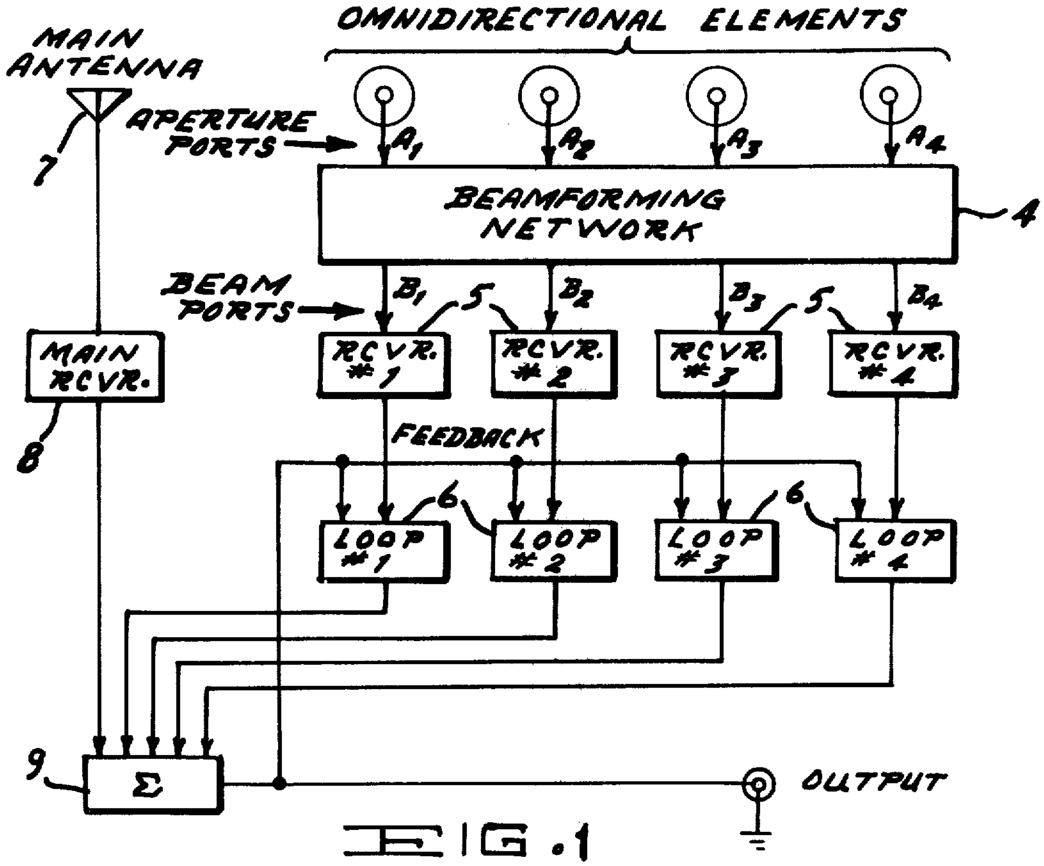
FIG. 1 is a block diagram of one presently preferred embodiment of the invention.

The beamport sidelobe canceller of the invention can be represented in its simplest form by the block diagram of FIG. 1. Four omnidirectional antenna elements are assumed for the set of auxiliary aperture port inputs. The four aperture ports (A1 through A4) are combined in a beam forming network 4 to generate four beamport outputs (B1 through B4). In a manner similar to the way in which the operation of a network bandpass filter works in the frequency domain, the four beamports can each be considered to be a space-pass filter tuned to different segments of space.

Circuits of this type are well known and are disclosed in the published handbook, *Microwave Scanning Antennas*, pp 242-265, Academic Press 1966, and in U.S. Pat. No. 3,981,014 entitled, *Interference Rejection System for Multi-Beam Antenna*, issued to Raymond J. Masak Sept. 14, 1976.

The outputs from beamport outputs (B1 through B4) are processed by auxiliary receives 5 to provide separate auxiliary channels that supply individual adaptive control loops 6. The outputs of control loops 6 are summed in combining means 9 with the received signals from the main communication system illustrated in FIG. 1 by main antenna 7 and main receiver 8. Combining means 9 provides both the system output and a feedback signal for adaptive control loops 6. Adaptive control loops 6 are conventional circuits of the type disclosed by U.S. Pat. No. 3,978,483 entitled, *Stable Base Band Adaptive Loop*, issued to Bernard L. Lewis et al. Aug. 31, 1976, and U.S. Pat. No. 3,932,818 entitled, *Spectrum Notcher*, issued to Raymond J. Masak Jan. 13, 1976.

Figure 3:
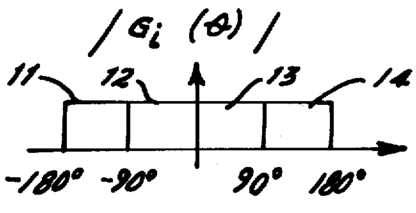
FIG. 3 is a waveform showing the shape of each beamport spatial transfer function.

The four separate beams from beamports B1 through B4 are illustrated by waveforms 11, 12, 13 and 14 in FIG. 3. The shape of each beamport spatial transfer function, $|G_i(\theta)|$, is assumed to be rectangular for the sake of simplicity. In an actual aperture antenna and beam forming network design, beam sidelobes would of course exist.

Figure 2:
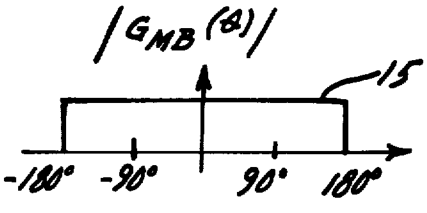
FIG. 2 is a waveform showing the shape of the main beam spatial transfer function.

The spatial transfer function, $|G_{MB}(\theta)|$, of the main antenna is illustrated by waveform 15 in FIG. 2 and covers the entire angular range of interest from beam B1 through Beam B4. In operation, after passage through appropriate receivers 5 each of the four beamport outputs becomes the input to an adaptive control loop 6. The outputs of all the four control loops are summed with the output of the main antenna receiver 8 by combining means 9 generating both the system output and the loop feedback function.

If a single jamming signal is present it will always appear at the main antenna receiver output regardless of its angular location. Since it is always in the output of the main antenna it will become part of the feedback signal. This feedback signal will correlate with the beamport output in which the jammer is present, generating the proper amplitude and phase weight in the associated control loop such that cancellation at the system output occurs. Only one adaptive control loop is activated in the presence of a single jammer.

If between one and four spatial jamming signals are present, each located in a different beamport output, each loop will be working only against the jamming signal present in that beamport output. If the loop is configured with a system limiter, the performance against each isolated jammer will be optimal. Since the beamport spatial filters are assumed for this discussion to be perfectly rectangular no beamport crosstalk will occur. Therefore, optimal performance against the spatially isolated jamming signals will be maintained regardless of the relative power ratios between the jammers.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. An electromagnetic wave communication system having means for discriminating against interfering signals comprising a main communication system for receiving desired and interfering electromagnetic wave energy from a given angular region of space, an auxiliary n-channel system for receiving and space filtering into n discrete contiguous segments electromagnetic wave energy from said angular region of space, each channel thereof being assigned to a different spatial segment of said angular region of space and having an output responsive to desired and interfering electromagnetic wave energy received therefrom, an adaptive control loop connected to receive the output of each auxiliary system channel, and combining means for summing main communication system received electromagnetic wave energy and the outputs of said adaptive control loops and for generating a system output and an adaptive control loop feedback signal, said adaptive control loop feedback signal being adapted to initiate in said control loops the generation of cancellation signals in response to correlation between interfering signals appearing in auxiliary system channels and the same interfering signals appearing in related portions of the main communication system received electromagnetic wave energy.

* * * * *